Figure 8:
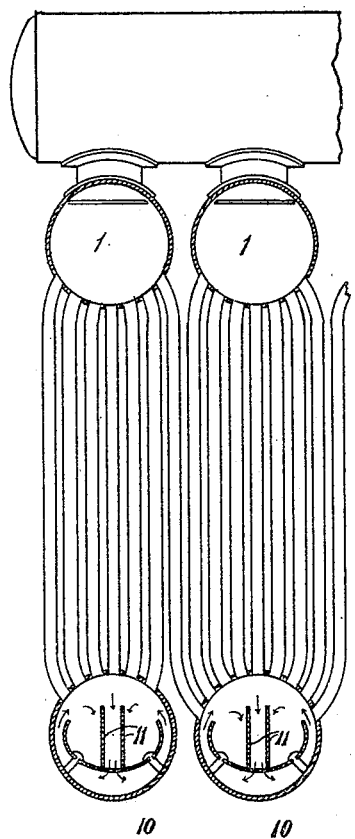

No. 808,437. PATENTED DEC. 26, 1905.
J. P. DAVIES.
WATER TUBE BOILER.
APPLICATION FILED JUNE 23, 1904.
6 SHEETS—SHEET 1.
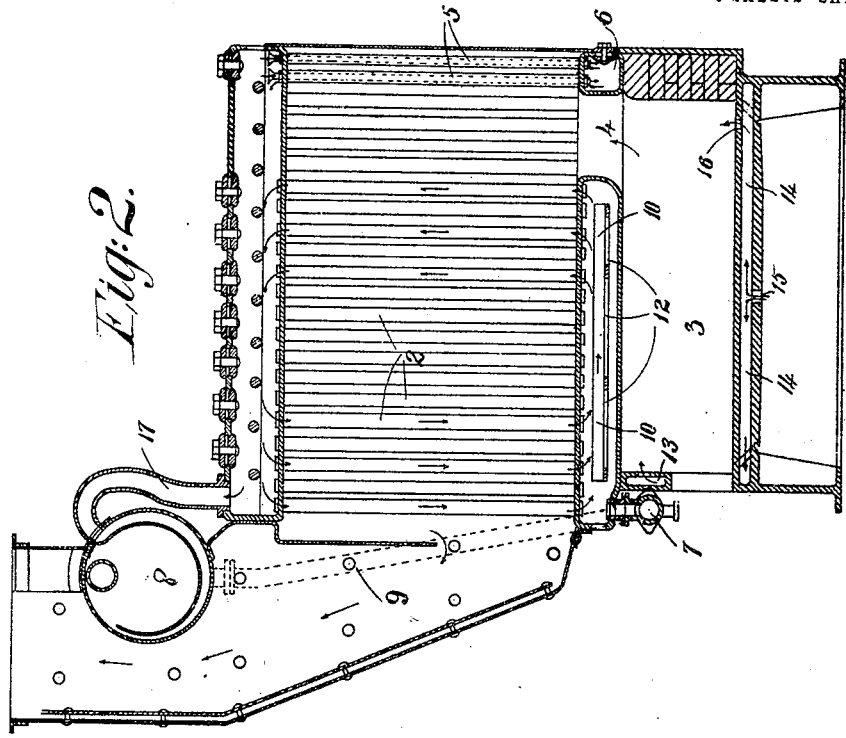
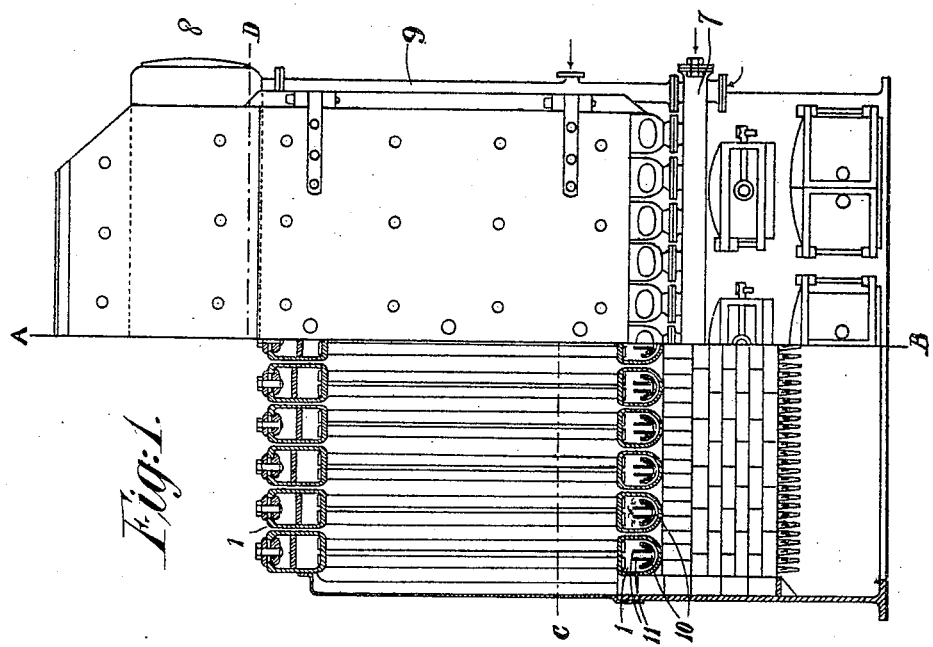
Witnesses
Edwin D. Bartlett
Albert J. Neale
Inventor
John Prothero Davies
per H. Sefton Jones
Attorney No. 808,437. PATENTED DEC. 26, 1905.
J. P. DAVIES.
WATER TUBE BOILER.
APPLICATION FILED JUNE 23, 1904.
6 SHEETS—SHEET 2.
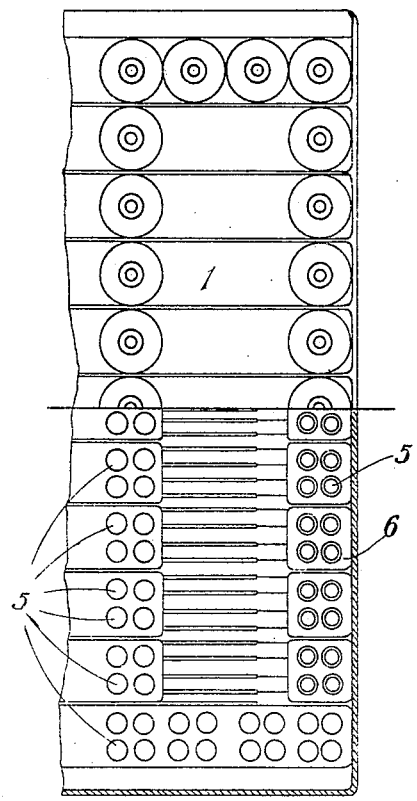
Fig:3.
Witnesses
Edwin D. Bartlett
Albert J Seale
Inventor
John Prothero Davies
per H Sefton Jones
Attorney No. 808,437. PATENTED DEC. 26, 1905.
J. P. DAVIES.
WATER TUBE BOILER.
APPLICATION FILED JUNE 23, 1904.
6 SHEETS—SHEET 3.
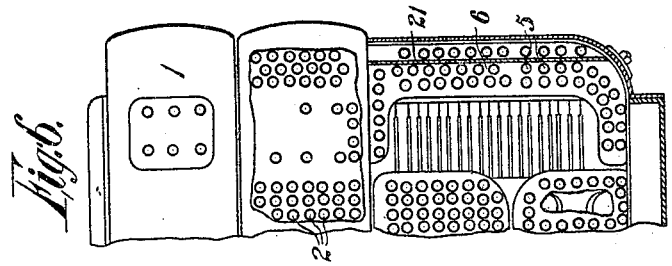
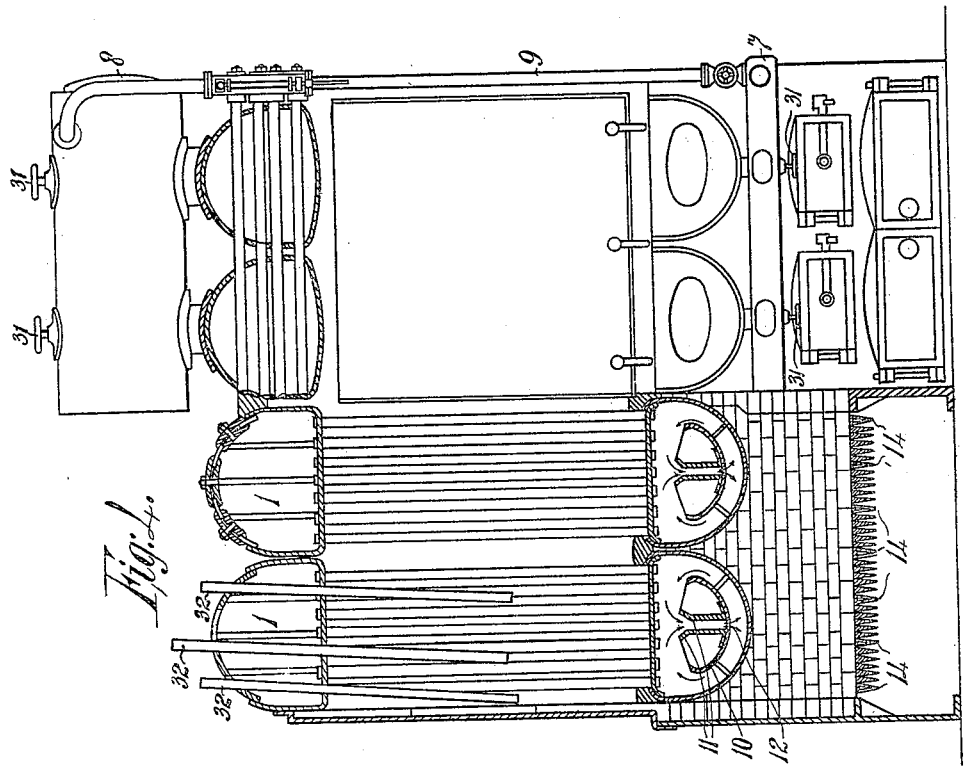
Witnesses
Arthur J. Stephens
Albert Veale
Inventor
John Prothero Davies
per Herbert Sefton Jones
Attorney.

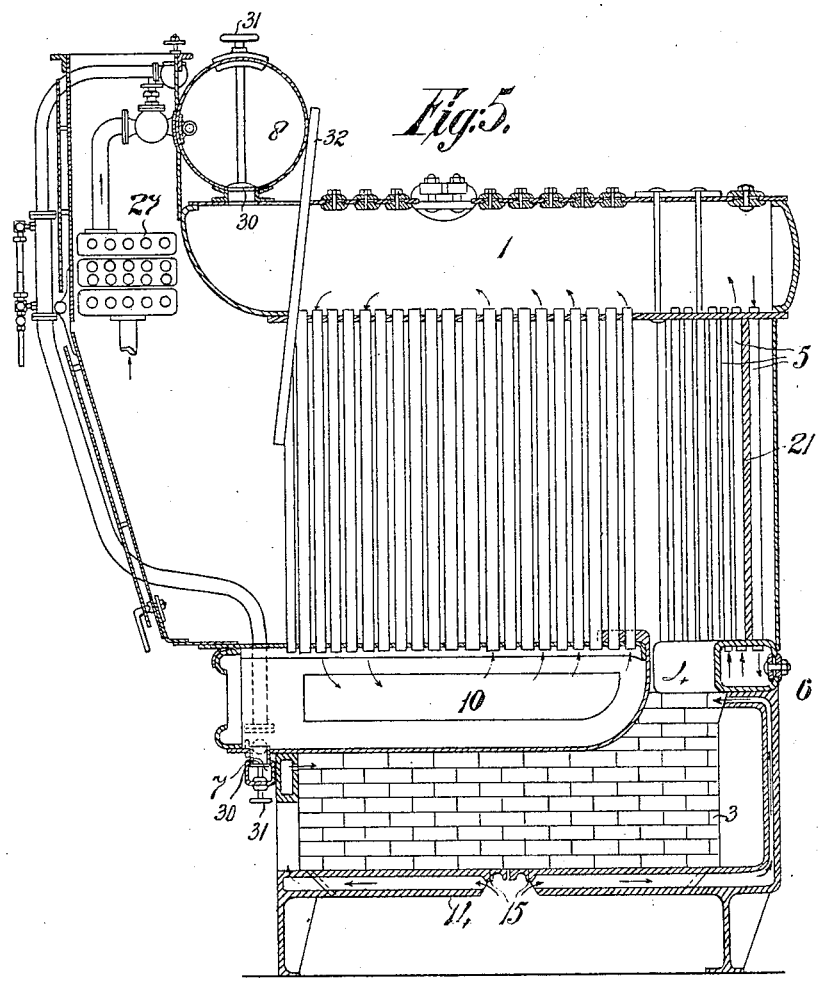

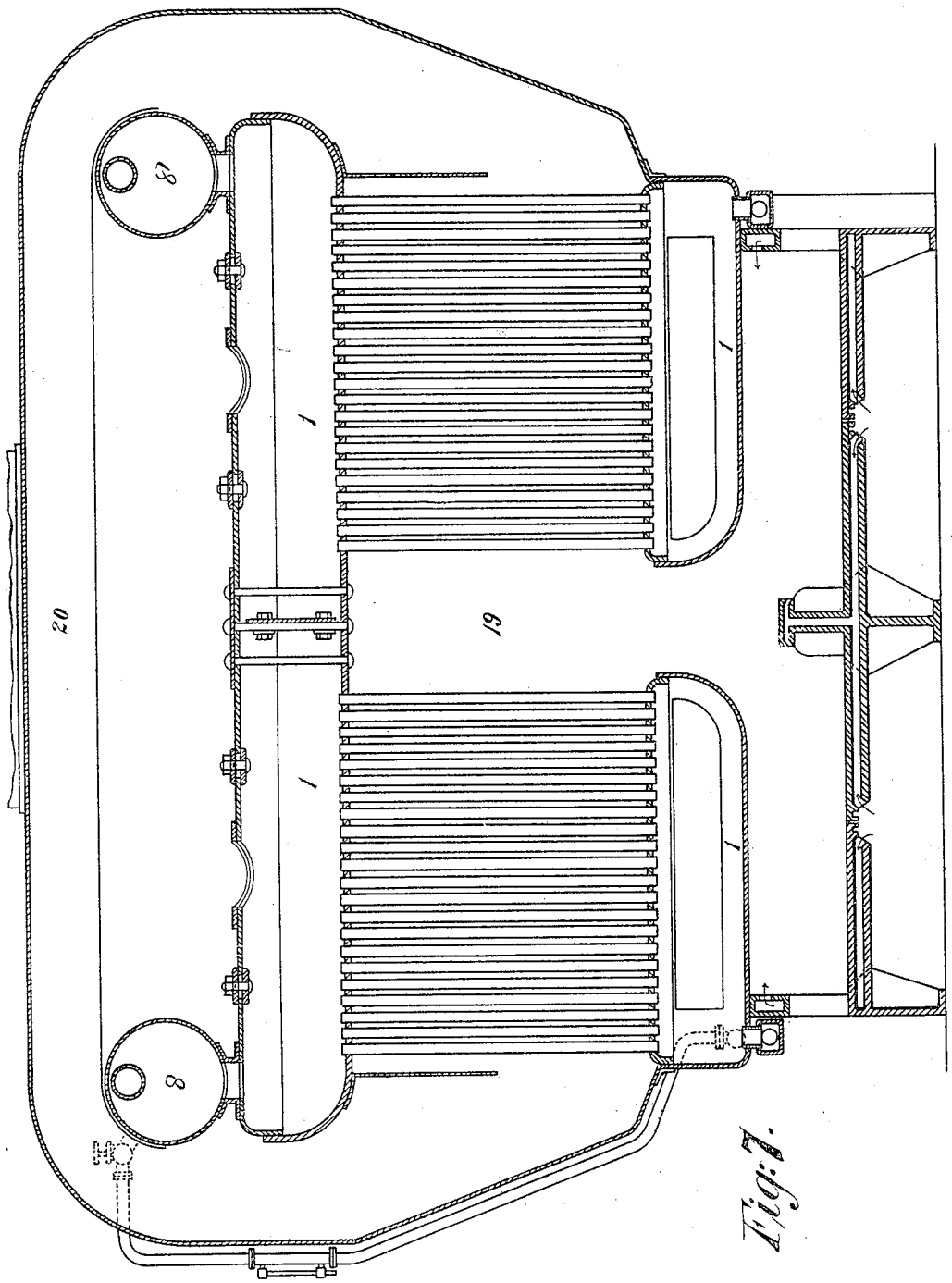

No. 808,437. PATENTED DEC. 26, 1905.
J. P. DAVIES.
WATER TUBE BOILER.
APPLICATION FILED JUNE 23, 1904.

6 SHEETS—SHEET 6.

UNITED STATES PATENT OFFICE.

JOHN P. DAVIES, OF BROCKLEY, LONDON, ENGLAND.

WATER-TUBE BOILER.

No. 808,437. Specification of Letters Patent. Patented Dec. 26, 1905.

Application filed June 23, 1904. Serial No. 213,842.

*To all whom it may concern:*

Be it known that I, JOHN PROTHERO DAVIES, a subject of the King of Great Britain, residing at No. 71 Adelaide road, Brockley, London, England, have invented new and useful Improvements in and Relating to Water-Tube Boilers, of which the following is a specification.

This invention relates to improvements in water-tube boilers, and more particularly to those boilers comprised of elements consisting of upper and lower drums joined by vertical stacks of tubes, with the furnace arranged below the lower drums and a combustion-chamber arranged at the back of the furnace, so that the products of combustion pass from the furnace through the combustion-chamber to the tube-chamber between the aforesaid upper and lower drums and from thence to the flue.

The primary objects of my invention are to provide an improved arrangement of the elements so that any one of said elements may be shut off from the other elements and withdrawn easily from the boiler, if desired, and an improved circulation of the water in and between said elements; but various subordinate objects will appear hereinafter as the description of the preferred embodiment of my invention is developed.

In the accompanying drawings, Figure 1 is a front view, partly in section, of the improved boiler. Fig. 2 is a sectional side view on the line A B of Fig. 1. Fig. 3 is a plan view, on an enlarged scale, partly in section, on the line C D of Fig. 1, the steam-dome having been removed. Fig. 4 is a front view of an improved boiler with larger drums and a larger number of tubes joining said drums. Fig. 5 is a central longitudinal section through one of the elements shown in Fig. 4. Fig. 6 is a plan view of Fig. 4, showing sectional views of a top drum and the combustion-chamber. Fig. 7 is a double-ended boiler provided with the improvements, and Fig. 8 shows a detail view in which the last row of tubes of the first element pass from the upper drum of the first element to the lower drum of the second.

Like numerals are employed to designate corresponding parts throughout the views.

Referring now to the drawings, I arrange my boiler as a number of separate elements, each of said elements comprising two or more steam and water drums 1, said drums being arranged either lengthwise with the furnace, as shown in the drawings, or across said furnace at the top and bottom of the flue. The lower drums are arranged to form the roof of the furnace 3, and, if desired, suitably-shaped fire-bricks or the like are arranged in the spaces between said drums. Stacks of tubes 2, preferably an equal number for each element, join said drums across the flue-chamber above the furnace, the roof of said tube or flue chamber being formed in a similar manner, as described above, with the spaces between the said drums filled in by fire-bricks or the like.

A combustion-chamber 4 is arranged at the back of the furnace constructed by carrying the top steam and water drums which form the roof of the tube-chamber about one and a half to two feet farther back than the lower water-drums, as shown in Figs. 2 and 5. The top drums form the roof of said combustion-chamber, as above mentioned, and the sides and back of the chamber are inclosed by nests of water-tubes 5, joined to the sides and ends of the upper water-drums and to a special lower water drum or drums 6. (Shown in Figs. 2, 3, 5, and 6.) As shown in Fig. 2, the tubes inclosing the sides of the combustion-chamber are preferably arranged as double or Field tubes to increase the circulation of the water. In order to obtain a complete circulation of the water through the elements, each of said tube elements is joined to a main junction-pipe 7. (See Figs. 1, 2, 4, and 5). This junction-pipe is joined to the main steam-dome 8 by pipes 9, arranged at the sides of the boiler. In order to completely shut off one element from the others in case of the bursting of a tube or the like accident, I arrange lift-valves 30 between each tube element, adapted to be operated by a handle or handles 31 from the outside of the boiler.

The separate elements may in some cases be joined, as shown in Fig. 8, by the last row of tubes passing from the first upper drum at the top of the flue to the second lower drum, and so on throughout the flue.

Inside the drums, more especially the lower drums, as shown in the drawings, I arrange a semicircular baffle 10, conveniently about half the diameter of the drum in which it is inserted, provided with a slot or slots 12 down its center. On said baffle I arrange two upright plates 11. This arrangement insures an equal circulation of the water passing through the drums, which will follow the course indicated by the arrows shown in Figs. 4 and 5. This arrangement has the further advantage that a considerable amount of the sediment which would otherwise tend to fall to the bottom of the drum will be caught and held in said baffle by the plates 11.

A complete combustion is obtained in the furnace and in the combustion-chamber before the smoke and gases from said furnace pass into the tube-chamber by the arrangement of a hollow furnace-front provided with a chamber 13, into which air passes from the ash-pit through hollow fire-bars 14 from the apertures 15. It will be seen from the drawings that the air passes in the same manner through hollow fire-bars out through a port 16 into the combustion-chamber. By this arrangement the air is thoroughly heated both when delivered at the front of the furnace and at the combustion-chamber, and so insures a complete combustion of the gases before the products of combustion pass into the tube-chamber.

I may arrange an economizer 27 of any ordinary type in the flue in front of the steam and water tubes, as shown in Figs. 4 and 5. It should be understood that the economizer is equally applicable to the small-sized boilers and is only omitted from Figs. 1 and 2 for the sake of clearness.

Figs. 1, 2, and 3 show my invention adapted for small boilers, such as may be used in torpedo-boats and the like. In such boilers it is necessary to use water and steam drums of greatly-reduced diameter as compared with boilers of larger size. I therefore construct a number of separate elements comprising upper and lower drums, preferably about nine inches in diameter, joined by stacks of tubes, as described above. When it is desired to renew the tubes in one of said elements, it is only necessary to detach the junction-tube 7 from the bottom of the drum and withdraw the whole element from the boiler. The upcast or steam pipes 17, leading from the upper drums to the steam-dome, are of course arranged with joints to allow of easy separation.

In Figs. 4, 5, and 6 I show my invention applied to boilers of a larger type. In such boilers I may use a larger number of tubes between the drums forming the separate elements; but in all essential particulars the boiler is constructed in the same manner as shown in Figs. 1, 2, and 3. The nearly-vertical tubes 32 in Figs. 4 and 5 are shown in the process of removal.

Fig. 7 shows my invention applied to a double-ended boiler. In this arrangement a combustion-chamber 19 is arranged in the center of the boiler between two sets of steam-drums arranged as described above. The products of combustion after passing through the tubes pass out at the ends of the boiler and join in a central flue 20 in a convenient position above.

In the boiler above described the water as it is heated in the rear by the hot gases in the combustion-chamber circulates, as shown by the arrows in Figs. 2 and 5, toward the front and there falls downward, depositing its sediment in troughs formed by the upright plates arranged on the inner sides of the semicircular baffles 10 in the lower drums, whereupon it again travels toward the tubes surrounding the combustion-chamber.

What I claim is—

1. In a water-tube boiler the combination of a plurality of separate elements comprised of upper and lower drums joined by vertical stacks of tubes, circulation-baffles arranged in the drums of said elements, means for connecting said elements to one another, a furnace arranged beneath the lower drums of said elements, a combustion-chamber arranged at the back of said furnace and means for heating water arranged around the walls of said combustion-chamber, substantially as described.

2. In a water-tube boiler the combination of a plurality of separate elements comprised of upper and lower drums joined by vertical stacks of tubes, semicircular circulation-baffles arranged in the drums of said elements, slots arranged in the centers of said baffles, upright plates arranged on the inner sides of said baffles, means for connecting said elements to one another, a furnace arranged beneath the lower drums of said elements, a combustion-chamber arranged at the back of said furnace and means for heating water arranged around the walls of said combustion-chamber, substantially as described.

3. In a water-tube boiler the combination of a plurality of separate removable elements comprised of upper and lower drums joined by vertical stacks of tubes, semicircular circulation-baffles arranged in the drums of said elements, slots arranged in the centers of said baffles, upright plates arranged on the inner sides of said baffles, a steam-dome connected to the upper drums of said elements, a junction-pipe connecting the lower drums of said elements, pipes connecting said steam-dome with the said junction-pipe, means for disconnecting said steam-dome from said upper drums, means for disconnecting said junction-pipe from said lower drums, a furnace arranged beneath the lower drums of said elements and a combustion-chamber arranged at the back of said furnace, means for heating water arranged around the walls of said combustion-chamber, substantially as described.

4. In a water-tube boiler the combination of a plurality of separate elements comprised of upper and lower drums joined by vertical stacks of tubes, circulation-baffles arranged in the drums of said elements, means for connecting said elements to one another, a furnace arranged beneath the lower drums of said elements, a combustion-chamber arranged at the back of said furnace and nests of tubes arranged around the walls of said chamber joined to the upper drums of said elements and to lower drums arranged around the walls of said chamber, substantially as described.

5. In a water-tube boiler the combination of a plurality of separate removable elements comprised of upper and lower drums joined by vertical stacks of tubes, semicircular circulation-baffles arranged in the drums of said elements, slots arranged in the centers of said baffles, upright plates arranged on the inner sides of said baffles, a steam-dome connecting the upper drums of said elements, a junction-pipe connecting the lower drums of said elements, pipes connecting said steam-dome with said junction-pipe, means for disconnecting said steam-dome from said upper drums, means for disconnecting said junction-pipe from said lower drums, a furnace arranged beneath the lower drums of said elements, a combustion-chamber arranged at the back of said furnace and nests of tubes arranged around the walls of said chamber joined to the upper drums of said elements and to lower drums arranged around the walls of said chamber, substantially as described.

In testimony whereof I have signed my name to this specification in the presence of two subscribing witnesses.

JOHN P. DAVIES.

Witnesses:
  LEONARD E. HAYNES,
  JOHN A. JORDAN.